United States Patent Office 3,288,863
Patented Nov. 29, 1966

3,288,863
POLYNITRODIOL AND METHOD
OF PREPARATION
Thomas N. Hall, Adelphi, and Kathryn G. Shipp, Silver
Spring, Md., assignors to the United States of America
as represented by the Secretary of the Navy
No Drawing. Filed Sept. 30, 1963, Ser. No. 312,790
5 Claims. (Cl. 260—615)

The invention described herein may be manufactured and used by or for the Government of the United States of America for governmental purposes without the payment of any royalties thereon or therefor.

This invention relates to new and useful long chain polynitro diols and to methods for the preparation. In particular, this invention is directed to polynitro diols having the general formula:

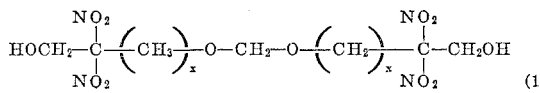

$$\text{HOCH}_2-\underset{\underset{NO_2}{|}}{\overset{\overset{NO_2}{|}}{C}}-(CH_2)_x-O-CH_2-O-(CH_2)_x-\underset{\underset{NO_2}{|}}{\overset{\overset{NO_2}{|}}{C}}-CH_2OH \quad (1)$$

wherein X is an integer.

Relatively long chain polynitro diols have been prepared, in the past, by the reduction of the corresponding alcohol with a reducing agent such as an alkali metal aluminum borohydride or by the reduction of the corresponding diacyl halide with an alkali metal borohydride. The first of these procedures is, however, disadvantageous in that the reducing medium is so strong that destruction of the aliphatic nitro groups usually accompanies the carbonyl reduction. Both procedures, in addition are inconvenient since they are time consuming and involve complex product recovery and purification steps. Moreover, these procedures are not necessarily compatible with the production of polynitro diols having formal groups in the chain.

It has now been found that long chain polynitro diols may be simply and safely prepared from bis(trinitroalkyl) formals by reducing the formal in an alkaline hydroperoxide solution to obtain the corresponding di-alkali metal salt and then reacting the salt with formaldehyde at an acid pH.

GENERAL PROCEDURE

The polynitro diols of this invention are preferably prepared by adding an alkali metal hydroxide, such as sodium hydroxide or potassium hydroxide, to an aqueous hydrogen peroxide solution of the appropriate bis(trinitroalkyl) formal in an aliphatic alcohol at a temperature below about 15° C. whereby the corresponding di-alkali metal salt of the bis(dinitroalkyl) formal is obtained. The temperature of the reaction mixture is then raised to about 40°–60° C. to facilitate the subsequent formaldehyde reaction and to make sure that any solids present are in solution. Aqueous formaldehyde is then added to the reaction and the pH of the solution is lowered to about pH 2 by the addition of a mineral acid such as HCl or $H_2SO_4$, whereupon the product crystallizes from solution after chilling the diluted reaction mixture. The primary purpose of this "one pot" synthesis is avoiding the isolation of unstable compounds such as the di-alkali metal salts of the bis(dinitroalkyl) formal. Although all of the reactions take place in solution, the potassium salt is much less soluble in methanol-water than the sodium salt, hence the physical form of "one pot" synthesis utilizing the potassium salt is a slurry or non homogeneous solution rather than a homogeneous solution as in the case of the sodium salt.

Alternatively, the potassium salt may be initially prepared and purified and subsequently reacted with formaldehyde and acid to obtain the products of the invention.

The concentrations of hydrogen peroxide and alkali metal hydroxide are not critical, however an excess of hydrogen peroxide over the theoretical stoichiometric concentration is added to insure complete reaction. Optimum yields of the alkali metal salts of bis(dinitroalkyl) formals are obtained by regulating the concentrations of hydrogen peroxide and alkali metal hydroxide within certain ranges, as shown in Tables I and II.

TABLE I

| Vol. (ml.) 27% $H_2O_2$/5 g. bis(2,2,2-trinitroethyl) formal: | Percent yield |
|---|---|
| 3.75 | 45 |
| 5.0 | 53 |
| 7.5 | 59 |
| 10.0 | 74 |

As indicated, the yield is improved as the concentration of $H_2O_2$ is increased.

TABLE II

| Grams NaOH/5 g. bis(2,2,2-trinitroethyl) formal: | Percent yield |
|---|---|
| 3.0 | 47 |
| 4.25 | 59 |
| 5.0 | 63.5 |
| 4.0 | 50 |
| 6.0 | 74 |
| 7.0 | 74 |

As indicated, the yield is improved with increasing concentration of NaOH.

The ultimate products of this invention are prepared by the reaction of formaldehyde with the bis(alkali metal-dinitroalkyl) formals which were initially prepared by the alkaline hydroperoxide reduction. Although aqueous formaldehyde is preferred, equivalent materials such as formal and polymers of formaldehyde such as paraformaldehyde and trioxane may also be used, but with less than optimum results. Moreover, if polymers of formaldehyde are to be used they must first be depolymerized. It is preferred that an excess of formaldehyde be added in order to decompose any excess alkaline hydroperoxide remaining from the reduction step.

The temperature, which for optimum yield should be kept below about 15° C. during the alkaline hydroperoxide reduction step, may be generally in the range of about 25° C. to about 60° C. during the $CH_2O$ addition and the subsequent acidification, although the preferred range is from about 40° C. to about 60° C. as shown in Table III.

TABLE III

| Temperature, ° C.: | Percent yield |
|---|---|
| 25 | 30 |
| 40–50 | 47 |
| 40–45 | 55 |
| 60 | 56 |

The invention is illustrated, but not limited, by the following specific examples of the preparation of a preferred long chain, polynitro, aliphatic diol. Wherever possible, alternate modes of operation are discussed but it will be recognized that various additional modifications can be made without deviating from the scope of the invention.

Example 1

A solution of 5 g. bis(2,2,2-trinitroethyl) formal and 10 ml. of 27% aqueous hydrogen peroxide solution in 35 ml. of methanol was prepared in a 200 ml. Erlenmeyer flask equipped with a magnetic stirrer and a thermometer. This solution was cooled to 0°–10° C. in an ice plus water bath. A solution of 6 g. NaOH in 12 ml. of a 50% methanol-water mixture was added dropwise to the solution of bis(2,2,2-trinitroethyl) formal and hydrogen peroxide. The addition was carried out at a rate such that the temperature of the reaction mixture did not exceed 15° C. Upon completion of the addition of NaOH, the ice plus water bath was removed and the mixture was warmed to 40° C. in a water bath and 15 ml. water was added to dissolve all solids present. To the reaction mixture there was then added 10 ml. of 37% aqueous formaldehyde solution at a rate such that the temperature was maintained at about 40°–55° C. An additional 5 ml. of 37% aqueous formaldehyde solution was added at once and the resulting solution was acidified by the addition of 15 g. of concentrated hydrochloric acid until the solution was pH 2 as determined by acid test paper. The reaction mixture was then diluted with 80 ml. water to produce a solution containing approximately 25% methanol and chilled at −20° C. The product, 2,2,8,8-tetranitro-4,6-dioxa-1,9-nonanediol monohydrate separated as fine, white rods which were separated by filtration, washed with cold water and dried. The yield of product was 78% (3.8 g.) of theoretical, based on the weight of bis(2,2,2-trinitroethyl) formal used.

The product had the following physical characteristics.

Melting point:
  Anhydrous form _____ 61.5–62.5° C.
Crystal density:
  Anhydrous form _____ 1.66.
  Monohydrate _____ 1.64.
Impact sensitivity:
  Anhydrous form _____ 69 cm., ERL machine.
  Monohydrate _____ 291 cm., ERL machine.
Solubility _____ Very sol. in polar solvents (e.g. ether, acetone); sl. sol. in water; nearly insol. in hexane, $CCl_4$.

Elemental analysis.—Calc'd for $C_7H_{12}O_{12}N_4$. Theory: C, 24.43%; H, 3.50%. Found: C, 24.36%; H, 3.80%.

The anhydrous and monohydrate forms of the product were distinguished by qualitative and quantitative determinations. A simple method of analysis is based on the fact that 2,2,8,8-tetranitro-4,6-dioxa-1,9-nonanediol is completely dissociated in basic solution to salts of bis(2,2-dinitroethyl) formal. Both the product and the potassium salt of bis(2,2-dinitroethyl) formal in 0.15 N aqueous NaOH show an absorption maximum at 363 millimicrons (Beckman Model DU Quartz Spectrophotometer) due to the anion,

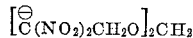

The molecular weight of the product was shown to be that of 2,2,8,8-tetranitro-4,6-dioxa-1,9-nonanediol, having one molecule of water of hydration, by measuring the optical density, at 363 millimicrons, of a solution of a weighed amount of the product in 0.15 N aqueous NaOH in a 1 cm. cell (DU Spectrophotometer) and calculating the molecular weight from these data and the $\epsilon$ of bis(2-potassium-2,2-dinitroethyl) formal in 0.15 N aqueous NaOH.

That the product was in the form of its monohydrate was also determined by infrared spectrophotometric analyses (Beckman IR 4 Infrared Spectrophotometer). The monohydrate shows a strong band at 1640 cm.$^{-1}$ which is absent in the spectrum of the anhydrous compound.

By using bis(trinitroalkyl) formals, other than the bis(2,2,2-trinitroethyl) formal of Ex. I, other long chain polynitro diols may be snythesized. For instance, polynitro diols of the type illustrated by Formula 1 wherein X is 2, 3, 4, or more may be obtained from the appropriate bis(trinitroalkyl) formals, $[(NO_2)_3C(CH_2)_xO]_2CH_2$.

Example II

The procedure of Ex. I was followed, except that KOH was used in lieu of NaOH in the preparation of the bis (alkali metal-2,2-dinitroethyl) formal salt. As in Ex. I, the product was analyzed as 2,2,8,8-tetranitro-4,6-dioxa-1,9-nonanediol monohydrate.

Example III

The example illustrates an alternative procedure to the "one pot" synthesis of Ex. II.

*Synthesis of bis(2-potassium-2,2-dinitroethyl)formal.*—A solution of 10 g. of bis(2,2,2-trinitroethyl) formal in 75 ml. of methanol was prepared in a 500 ml. 3-neck flask fitted with a mechanical stirrer, thermometer, dropping funnel and ice-salt bath. A 15 ml. portion of 30% aqueous $H_2O_2$ was added rapidly and the resulting solution was cooled to 0° C. A solution of 12 g. of 85% KOH in 75 ml. $CH_3OH$ was added slowly during 20 minutes while stirring and maintaining the temperature of the reaction under 10° C. A fine yellow precipitate formed during the addition of the alkali. After the addition of the KOH was complete, the reaction mixture was stirred at 0° C. for 15 minutes and then filtered with suction. The reaction mixture was not allowed to become dry at this point in order to avoid spontaneous decomposition. The filter cake was then washed three times with 25 ml. portions of cold $CH_3OH$ but still not sucked dry and then immediately dissolved in 200 ml. of 2% aqueous KOH solution at about 50° C. This solution was filtered and chilled at 10° C. in the refrigerator. The yellow crystalline product was filtered off, washed well with $CH_3OH$ and dried. The recrystallized product was recovered in 75% yield.

*Preparation of 2,2,8,8-tetranitro-4,6-dioxa-1,9-nonanediol.*—A slurry of the dipotassium salt of bis(2,2-dinitroethyl) formal prepared above was made by adding 7.2 g. of the salt to 20 ml. of water in a 50 ml. beaker equipped with a magnetic stirrer and thermometer. To the slurry was added 6.5 g. of a 37% aqueous solution of formaldehyde and the mixture was warmed to 40° C. with a water bath. Concentrated HCl (4.0 g.) was added dropwise during 10 minutes at a rate such that the temperature did not exceed 45° C. The potassium salt dissolved during the HCl addition and separated from the mixture as a yellow oil. When all of the acid had been added the water bath was removed and stirring was continued. At this point the pH of the aqueous phase was pH 2 as determined by acid test paper. After about 10 minutes the temperature of the reaction mixture had dropped to 35° C. and the oil began to crystallize as hard, white crystals. Stirring was continued for 1½ hours, the mixture was chilled and filtered and the filter cake was washed with water and dried. The dry product, 2,2,8,8-tetranitro-4,6-dioxa-1,9-nonanediol monohydrate was obtained in 88% of theoretical yield (6.3 g.) based on the dipotassium salt. Upon recrystallization from methylene chloride the product was obtained in 83.5% of theoretical yield.

The monohydrate, as obtained in the preceding examples, may be converted to anhydrous 2,2,8,8-tetranitro-4,6-dioxa-1,9-nonanediol by any one of the following methods:

(1) The monohydrate may be crystallized from dried methylene chloride or chloroform or other solvent therefor and excess solvent removed under reduced pressure with a controlled leak of dry air, (2) The monohydrate may be melted and the melt allowed to crystallize in a dry atmosphere (18% rel. humidity), (3) The crystals of the monohydrate may be crushed and dried under reduced pressure with a controlled leak of dry air.

The polynitro diols of the invention are useful as intermediates in the preparation of high energy binders for explosive and propellant compositions and will form elastomers with isocyanates. For example, bis(2-fluoro-2,2-dinitroethyl) formal, a plasticizer used in high energy propellant binders, may be prepared by the aqueous fluorination of 2,2,8,8 - tetranitro - 4,6-dioxa-1,9-nonanediol. Moreover, the reaction of 2,2,8,8-tetranitro-4,6-dioxa-1,9-nonanediol with toluene diisocyanate yields a polymeric rubbery material which may be molded to make a formed explosive.

Obviously many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. A polynitro diol having the following formula:

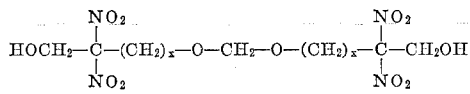

wherein $x$ is an integer from 1 to 4.

2. The compound 2,2,8,8 - tetranitro - 4,6-dioxa-1,9-nonanediol.

3. The compound 2,2,8,8 - tetranitro - 4,6 - dioxa-1,9-nonanediol monohydrate.

4. The method of preparing 2,2,8,8-tetranitro-4,6-dioxa-1,9-nonanediol monohydrate which comprises reacting in solution, at a temperature ranging from about 25° C. to about 60° C., the dialkali metal salt of bis(2,2-dinitroethyl) formal with aqueous formaldehyde and subsequently acidifying the solution with a mineral acid.

5. The method preparing 2,2,8,8-tetranitro-4,6-dioxa-1,9-nonanediol monohydrate which comprises reacting in solution, at a temperature ranging from about 40° C. to about 60° C., the dialkali metal salt of bis(2,2-dinitroethyl) formal with aqueous formaldehyde and subsequently acidifying the solution with a mineral acid.

References Cited by the Examiner
UNITED STATES PATENTS
2,135,444   11/1938   Vanderbilt.
2,456,585   12/1948   Hass et al. _____ 260—638
2,543,957   3/1951   Crooks et al.

OTHER REFERENCES
Vanderbilt et al.: "Ind. and Eng. Chem.," vol. 32, pp. 34–38 (1940).

Morton: "Laboratory Technique in Organic Chemistry," McGraw Hill Book Co. (1938), New York, 1st edition, pp. 1–2, 9–15.

Vogel: "Textbook of Practical Organic Chemistry Including Qualitative Organic Analysis," Longmans, Green and Co., New York, 3rd edition, 1956, pp. 135–139.

LEON ZITVER, *Primary Examiner.*

DANIEL D. HORWITZ, *Examiner.*

H. T. MARS, *Assistant Examiner.*